(12) United States Patent
Brkovic

(10) Patent No.: US 8,929,103 B2
(45) Date of Patent: Jan. 6, 2015

(54) INTEGRATED MAGNETICS WITH ISOLATED DRIVE CIRCUIT

(75) Inventor: Milivoje Brkovic, Carlsbad, CA (US)

(73) Assignee: PAI Capital LLC, San Jose, CA (US)

( * ) Notice: Subject to any disclaimer, the term of this patent is extended or adjusted under 35 U.S.C. 154(b) by 251 days.

(21) Appl. No.: 13/427,384

(22) Filed: Mar. 22, 2012

(65) Prior Publication Data
US 2012/0257421 A1 Oct. 11, 2012

Related U.S. Application Data

(60) Provisional application No. 61/466,824, filed on Mar. 23, 2011.

(51) Int. Cl.
H02M 3/335 (2006.01)
H01F 27/38 (2006.01)

(52) U.S. Cl.
CPC ........... *H02M 3/33592* (2013.01); *H01F 27/38* (2013.01); *Y02B 70/1475* (2013.01)
USPC ..................... 363/21.18; 363/21.14

(58) Field of Classification Search
USPC .......... 363/21.05–21.1, 21.13–21.18
See application file for complete search history.

(56) References Cited

U.S. PATENT DOCUMENTS

| | | | |
|---|---|---|---|
| 4,821,163 A | | 4/1989 | Bloom |
| 5,155,676 A | * | 10/1992 | Spreen .......................... 363/126 |
| 5,784,266 A | | 7/1998 | Chen |
| 5,907,481 A | | 5/1999 | Svardsjo |
| 6,111,769 A | * | 8/2000 | Zhang et al. .................. 363/127 |
| 6,788,553 B1 | * | 9/2004 | Jin et al. ..................... 363/21.06 |
| 6,804,125 B2 | | 10/2004 | Brkovic |
| 6,888,728 B2 | * | 5/2005 | Takagi et al. .................... 363/17 |
| 7,002,818 B2 | * | 2/2006 | Hamilton ....................... 363/127 |
| 7,102,898 B2 | | 9/2006 | Brkovic |
| 7,876,191 B2 | | 1/2011 | Chandrasekaran et al. |
| 2001/0024373 A1 | | 9/2001 | Cuk |
| 2002/0110005 A1 | * | 8/2002 | Mao et al. .................. 363/21.06 |
| 2004/0257837 A1 | * | 12/2004 | Xu et al. ..................... 363/21.04 |

(Continued)

FOREIGN PATENT DOCUMENTS

CN 201266888 Y 7/2009

OTHER PUBLICATIONS

International Search Report and Written Opinion, dated Oct. 25, 2012, 10 pp., in corresponding International Application No. PCT/US2012/030301.

*Primary Examiner* — Adolf Berhane
*Assistant Examiner* — Gary Nash
(74) *Attorney, Agent, or Firm* — Waddey Patterson; Mark J. Patterson; Gary L. Montle

(57) ABSTRACT

A switch-mode power converter includes a power isolation transformer and a drive transformer having their various windings collectively wound on a magnetic core having a center leg and outer legs. A primary winding and one or more secondary windings of the power transformer are wound on the center leg, and first and second windings of the drive transformer are wound on an outer leg. A primary control circuit controls one or more primary switches to supply the input voltage to the primary winding. A secondary control circuit controls secondary switches connected between the secondary windings and a load. Another control circuit controls operation the primary and secondary control circuits based at least in part on a feedback signal. The drive transformer windings are further configured to provide isolation between the primary control circuit and the synchronous rectifier control circuit.

18 Claims, 14 Drawing Sheets

(56) References Cited

U.S. PATENT DOCUMENTS

| | | | |
|---|---|---|---|
| 2005/0041441 A1* | 2/2005 | Nagai et al. | 363/21.06 |
| 2005/0068792 A1* | 3/2005 | Yasumura | 363/21.06 |
| 2006/0077694 A1* | 4/2006 | Meszlenyi | 363/16 |
| 2009/0196076 A1 | 8/2009 | Danstrom et al. | |
| 2009/0230776 A1 | 9/2009 | Ochi et al. | |
| 2009/0244931 A1* | 10/2009 | Brkovic | 363/21.1 |

* cited by examiner

INTEGRATED MAGNETICS WITH ISOLATED DRIVE CIRCUIT

CROSS-REFERENCES TO RELATED APPLICATIONS

This application claims benefit of the following patent application(s) which is/are hereby incorporated by reference: U.S. Provisional Patent Application No. 61/466,824, filed Mar. 23, 2011.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to switch-mode power converters. More particularly, the present invention relates to methods and devices for providing an isolated drive circuit integrated into a power transformer or power inductor.

A switch-mode power converter typically uses an inductor, a transformer, a capacitor, or some combination thereof, as energy storage elements to transfer energy from an input source to an output load in discrete pulses. Additional circuitry is added to maintain a constant voltage or constant current within load limits of the circuit. Using a transformer allows the output to be electrically isolated from the input source.

New challenges in the industry for DC/DC power supply designers demand higher efficiency and power density. This has resulted in the use of synchronous rectifiers that are implemented by replacing rectifying diodes in the output with MOSFET devices.

Using self-driven synchronous rectifiers in various converter topologies is attractive and popular because of their simplicity. This is primarily due to a lack of need for additional isolation between drive signals for the input side switches and the synchronous rectifiers. However, simplicity has its drawbacks. These drawbacks include: (a) cross conduction between the synchronous rectifiers and the primary side switches; (b) the drive voltage, being derived from a power transformer, varies with changes in input voltage and thus requires additional clamp circuitry and results in additional losses; and (c) the timing between the drive signals depends heavily on circuit parasitics.

One solution is to use direct drive for the synchronous rectifiers with well-controlled timing between the drive signals for the main switches (input side) and the synchronous rectifiers (output side). This solution thus allows for efficient operation of the synchronous rectifiers even at high switching frequencies. Yet another benefit of direct driven synchronous rectifiers is that the drive voltage (gate to source) is constant and independent of input voltage, further improving efficiency over a wide input voltage range.

Various isolated drive circuits have been proposed in the prior art. The most common technique for providing isolation is the use of a drive transformer. Various solutions using a drive transformer have been proposed, all of which require a separate magnetic core for the drive transformer.

One solution is proposed in U.S. Pat. No. 5,907,481 by Svardsjo in which a PWM signal is fed into a switch control circuit for the primary side switches and into a drive transformer with it outputs feeding a switch control circuit for the synchronous rectifiers. A disadvantage of this solution is that the drive transformer only transfers the PWM signal from one side of the converter to the other side and requires additional switch control circuitry as well as a power source for the driving switches.

In U.S. Pat. Nos. 6,804,125 and 7,102,898, Brkovic proposed an improved isolated drive circuit using a drive transformer which provides power and appropriate delays to the primary switches and the synchronous rectifiers. This circuit takes advantage of the leakage inductance of the drive transformer windings as well as the input capacitance of the primary switches (MOSFETs) to provide the necessary delays. The circuitry further discloses means to disable or enable the primary winding from a condition sensed on the secondary side even with a control and feedback circuit located on the output side.

A prior art isolated DC-to-DC converter which employs a double ended DC-to-DC converter having a half-bridge primary circuit and a full-wave secondary circuit employing synchronous rectifiers $S_1$ and $S_2$ is shown in FIG. 1. The circuit in FIG. 1 includes switches $Q_1$ and $Q_2$ (also called primary controllable power switches), capacitors $C_1$ and $C_2$, a power isolation transformer $T_1$, synchronous rectifiers $S_1$ and $S_2$, output inductor $L_o$, and capacitor $C_o$. The input voltage $V_{IN}$ is split with filtering capacitors $C_1$ and $C_2$. One end of primary winding $N_p$ of transformer $T_1$ is connected to the common node of capacitors $C_1$ and $C_2$ while the second end is connected to the common node of switches $Q_1$ and $Q_2$. Two secondary windings $N_{S1}$ and $N_{S2}$ are center tapped at a common node CT. The common node CT is connected to a low pass output filter including inductor $L_o$ and capacitor $C_o$ connected across the output of the converter and a load. The second end of winding $N_{S1}$ is connected to synchronous rectifier $S_1$ while the second end of winding $N_{S2}$ is connected to synchronous rectifier $S_2$. The polarity of the windings of transformer $T_1$ is chosen such that when switch $Q_1$ is on, synchronous rectifier $S_1$ is on and $S_2$ is off. Conversely, when switch $Q_2$ is on, synchronous rectifier $S_1$ is off and $S_2$ is on. Primary switches $Q_1$ and $Q_2$ are exemplified as MOSFETs (commonly used today) but may be also realized as IGBTs or other controllable switches.

The output voltage $V_{OUT}$ is fed into a CONTROL CIRCUIT which generates two output signals OUTA and OUTB having a 180° phase shift that are fed into a SWITCH CONTROL CIRCUIT which generates four signals $GQ_1$, $GQ_2$, $GS_1$ and $GS_2$ for driving switches $Q_1$, $Q_2$, $S_1$ and $S_2$, respectively.

The salient waveforms demonstrating operation of the circuitry in the converter shown in FIG. 1 are illustrated in FIG. 2. It is assumed, for simplicity of explanation, that all voltage waveforms (except OUTA and OUTB) have finite rise and fall times and that all switches have threshold voltages at one-half of the voltage amplitude of the drive signals. Also, the rise and fall times are exaggerated relative to switching period $T_S$ for purpose of explanation.

In the waveforms of FIG. 2:

$t_{d1}$ represents the time interval between turning-off synchronous rectifier $S_2$ and turning-on switch $Q_1$.

$t_{d2}$ represents the time interval between turning-off switch $Q_1$ and turning-on synchronous rectifier $S_2$.

$t_{d3}$ represents the time interval between turning-off synchronous rectifier $S_1$ and turning-on switch $Q_2$. In practice, usually $t_{d1} \approx t_{d3}$.

$t_{d4}$ represents the time interval between turning-off switch $Q_2$ and turning-on synchronous rectifier $S_1$. In practice, usually $t_{d2} \approx t_{d4}$.

$t_a$ represents the rise time of $V_{G1}$ from zero to threshold voltage of switch $Q_1$. This is also the time during which voltage $V_{G1}$ is non-zero and positive, while voltage $V_P$ is still zero.

$t_b$ represents the fall time of $V_{G1}$ from drive voltage to the threshold voltage of switch $Q_1$. This is also the time during which voltage $V_{G1}$ is non-zero and positive while voltage $V_P$ is non-zero and still positive ($V_{IN}/2$).

$t_c$ represents the rise time of $V_{G2}$ from drive voltage to the threshold voltage of switch $Q_2$. This is also the time during which voltage $V_{G2}$ is non-zero and positive, while voltage $V_P$ is still zero.

$t_d$ represents the fall time of $V_{G2}$ from drive voltage to the threshold voltage of switch $Q_2$. This is also the time during which voltage $V_{G2}$ is non-zero and positive while voltage $V_P$ is non-zero and negative ($-V_{IN}/2$).

$t_p$ represents the time during which $Q_1$ is on, voltage $V_P$ is positive ($V_{IN}/2$), voltage $V_{S2}$ is positive, and $S_2$ is off.

$t_n$ represents the time during which $Q_2$ is on, voltage $V_P$ is negative ($-V_{IN}/2$), voltage $V_{S1}$ is positive, and $S_1$ is off.

$T_S$ represents the switching period of the converter.

D represents the duty cycle of the logic signals OUTA and OUTB and is defined as a portion of the half of the switching period $T_S$ during which signal OUTA or OUTB are logic high. OUTA and OUTB are phase shifted by 180°, and are never at a logic high at the same time.

At t=0, signal OUTA becomes high, while signal OUTB is low. At the same moment, voltage $V_{GS2}$ begins falling and when it drops to zero, voltage $V_{G1}$ begins rising. After time $t_a$, voltage $V_{G1}$ reaches the threshold voltage of $Q_1$, and $Q_1$ is turned-on. At that moment, voltage $V_P$ starts rising to its positive value $V_{IN}/2$. Note that during time $t_a$, voltage $V_P$ is still zero (shorted by the output inductor current flowing in both secondary windings $N_{S1}$ and $N_{S2}$ in opposite directions). During time $t_p$, power is transferred from the input $V_{IN}$ to the output $V_{OUT}$ of the converter through switch $Q_1$, primary winding $N_p$, secondary winding $N_{S1}$, synchronous rectifier $S_1$ and output inductor $L_o$.

At $t=DT_S/2$, signal OUTA becomes zero (logic low), signal OUTB is still low, voltage $V_{G1}$ starts falling and after time $t_b$, reaches the turn-off threshold of switch $Q_1$, and $Q_1$ is turned-off. Once voltage $V_{G1}$ reaches zero, voltage $V_{GS2}$ increases and synchronous rectifier $S_2$ is turned-on at zero voltage $V_{S2}$ after time $t_{d2}$. Note that during time $t_b$, voltage $V_{G1}$ is falling while voltage $V_P$ is at $V_{IN}/2$. In practical realization, the voltage remains positive at $V_{IN}/2$ until $V_{G1}$ drops to zero. During time $t_x$, the output inductor current is split between the two secondary windings and conducting synchronous rectifiers $S_1$ and $S_2$ causing near zero voltage across all windings of transformer $T_2$.

At $t=T_S/2$, signal OUTB becomes high, while signal OUTA is low. At the same moment, voltage $V_{GS1}$ starts dropping and when it drops to zero, voltage $V_{G2}$ starts rising. After time $t_c$, voltage $V_{G2}$ reaches the threshold voltage of $Q_2$ and $Q_2$ is turned-on. At that moment, voltage $V_P$ starts falling to its negative value $V_{IN}/2$. Note that during time $t_c$, voltage $V_P$ is still zero (shorted by the output inductor current flowing in both secondary windings $N_{S1}$ and $N_{S2}$ in opposite directions). During time $t_n$, power is transferred from the input to the output of the converter through switch $Q_2$, primary winding $N_p$, secondary winding $N_{S2}$, synchronous rectifier $S_2$, and output inductor $L_o$.

At $t=T_S/2+DT_S/2$, signal OUTB becomes zero (logic low), signal OUTA is still low, voltage $V_{G2}$ starts falling and after time $t_d$ reaches the turn-off threshold of switch $Q_2$, and $Q_2$ is turned-off. Once voltage $V_{G2}$ reaches zero, voltage $V_{GS1}$ increases and synchronous rectifier $S_1$ is turned-on at zero voltage $V_{S1}$ after time $t_{d4}$. Note that during time $t_d$, voltage $V_{G2}$ is falling while voltage $V_P$ is at $-V_{IN}/2$. In practical realization, the voltage remains negative at $-V_{IN}/2$ until $V_{G2}$ drops to zero. During time $t_y$ (usually $t_x=t_y$), the output inductor current is split between the two secondary windings and conducting synchronous rectifiers $S_1$ and $S_2$, causing near zero voltage across all windings of transformer $T_2$.

As is now apparent to those of skill in the art, during turn-on of primary switches $Q_1$ and $Q_2$, the windings of power isolation transformer $T_1$ are shorted (time intervals $t_x$ and $t_y$, respectively in FIG. 2). On contrary, during turn-off of primary switches $Q_1$ and $Q_2$ (time intervals $t_b$ and $t_d$, respectively in FIG. 2) the windings of power isolation transformer $T_1$ are not shorted. This is the main reason that prevents using windings on power transformer $T_1$ to control turn-on and turn-off transitions of the primary switches. Voltage $V_P$ is controlled by turning-on and turning-off of the primary switches. Thus, a change in voltage $V_P$ across the winding $N_{P2}$ of the transformer $T_1$ occurs after the primary switches are turned-on and turned-off. Therefore, it is necessary to have a separate drive transformer for driving the primary switches.

FIG. 3 shows a prior art half-bridge converter with practical implementation of a drive transformer $T_2$, primary switches $Q_1$, $Q_2$, as well as synchronous rectifier control circuits. A detailed description of the prior art circuit shown in FIG. 4 is described in U.S. Pat. No. 7,102,898 B2 by Brkovic. Drive transformer $T_2$ is implemented as a separate component with windings integrated in the PCB. This implementation has advantages over a solution with windings wound around the magnetic core because it provides better repeatability and control of leakage inductance and capacitance of the drive transformer. Thus, better control of the required timing between the drive signals for primary switches and synchronous rectifiers is achieved.

Even though the circuit of FIG. 4 has advantages, in applications where high power density and small size are needed, the only way to reduce the size of drive transformer $T_2$ is to increase the switching frequency. This has a negative effect on the overall efficiency of the converter. In applications that require extremely high efficiency of the converter for a given size, operation at lower switching frequencies is needed which increases the size of the power transformer and output inductor. This leaves no room on the circuit board for a separate drive transformer or any other solutions for isolating the drive signals between the input and output of the converter, such as fast opto-couplers or opto-isolators.

Therefore, what is needed is new solution that eliminates the use of a separate drive transformer or other components for providing isolation for drive signals between the input and output sides of the converter.

BRIEF SUMMARY OF THE INVENTION

According to an embodiment of the invention, the windings of a drive transformer are embedded into a power transformer or inductor so that a separate magnetic core is not needed for the drive transformer. The windings of the drive transformer are wound around an outer leg of an E-shaped core, while windings of power transformer or inductor are wound around the center leg. Such a winding structure is used to keep the windings of the drive transformer tightly coupled, and at the same time, loosely coupled with the windings of the power transformer or inductor. Because of the loose coupling, it is possible to have different voltage waveforms in the windings of the drive transformer and windings of power transformer or inductor for a short period of time sufficient to initiate turn-on or turn-off of the controllable switches without significant voltage and current stresses in the circuitry for driving the drive transformer. The number of windings used in the drive transformer depends on the application as well as the converter topology. The maximum volt-second that the drive transformer can support is defined by the power transformer or inductor.

According to one aspect of the invention, power for driving the power switches after initial turn-on or turn-off is provided from a power transformer or inductor.

Another aspect of the invention is that the drive voltage may be clamped in order to be independent of changes in the input voltage. The clamped energy is used to power the control and drive circuitry after initial start-up of the converter thus simplifying the bias circuit and reducing power requirements during normal operation of the converter.

In certain embodiments of the invention, the windings of the drive transformer are wound around both the center and outer legs of the magnetic core of the power transformer or inductor.

BRIEF DESCRIPTION OF THE SEVERAL
VIEWS OF THE DRAWINGS

DETAILED DESCRIPTION OF THE INVENTION

Figure 1:
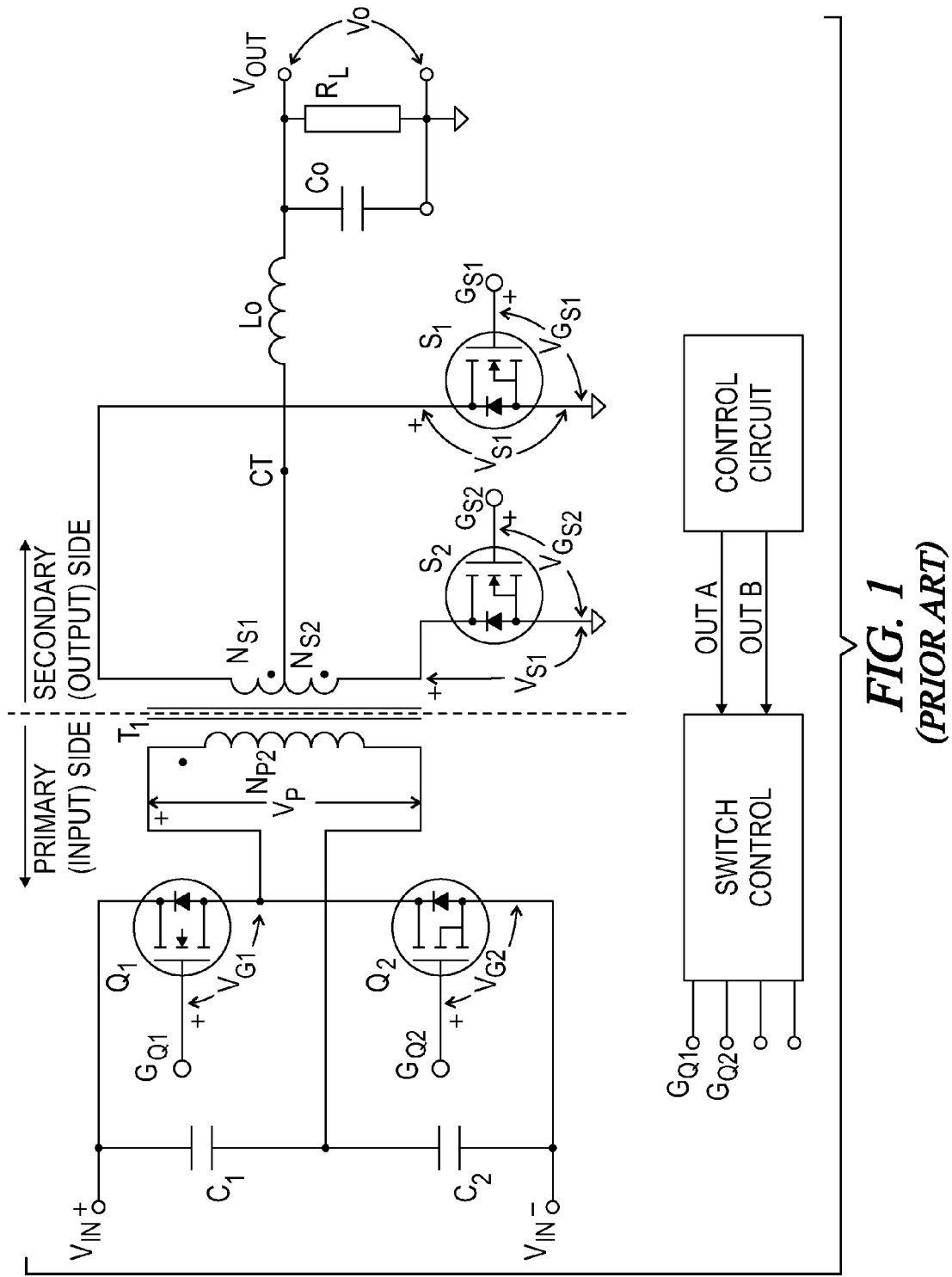
FIG. 1 is a schematic diagram of a prior art circuit using a half-bridge converter and drive transformer with a control and drive circuit referenced to the to the output side of the converter.
Figure 2:
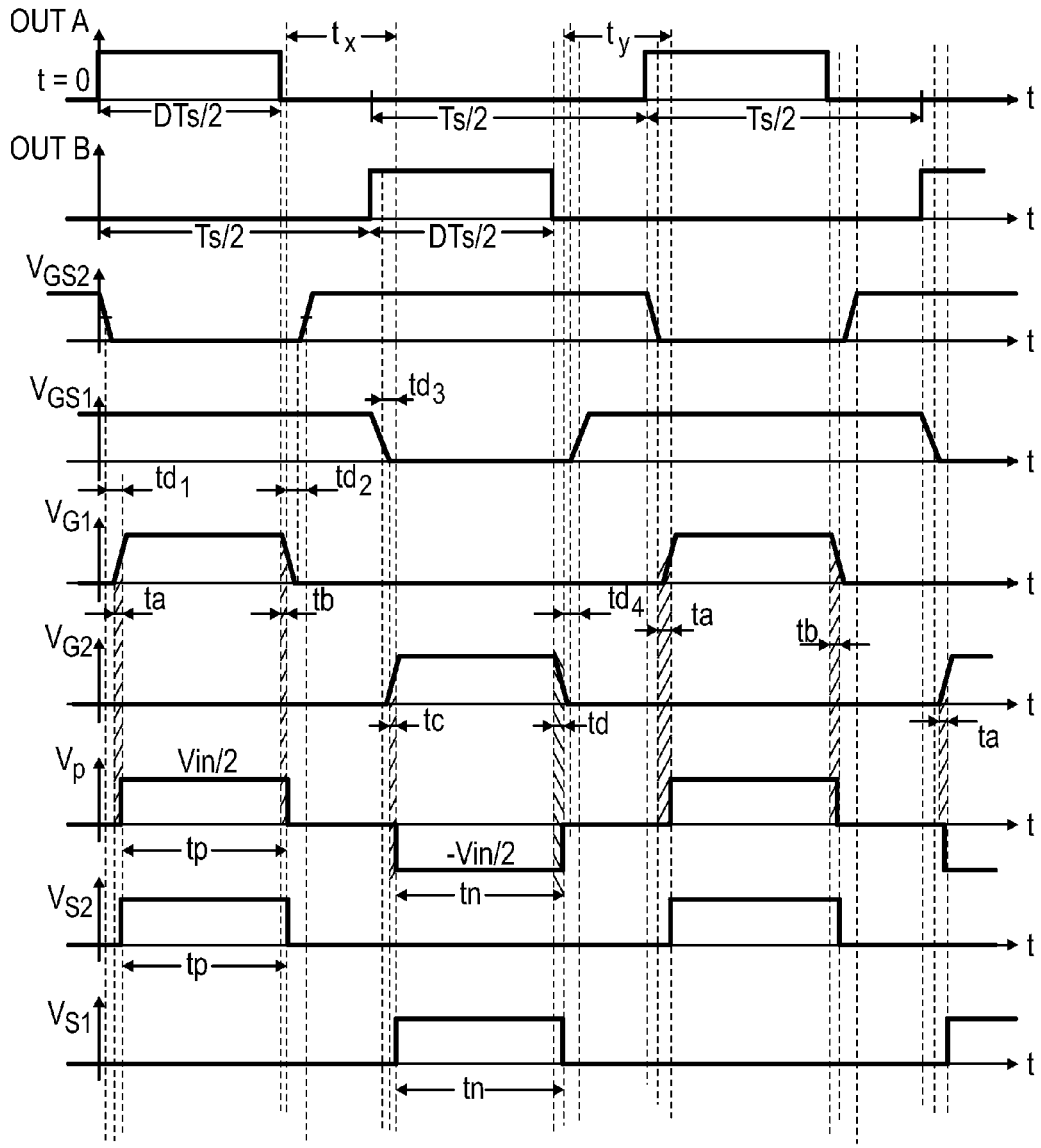
FIG. 2 is a graphical diagram representing salient waveforms derived from several nodes in the prior art circuit of FIG. 1.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The terms "control circuit" or "controller" as used herein may refer to at least a general microprocessor, an application specific integrated circuit (ASIC), a digital signal processor (DSP), a microcontroller, a field programmable gate array, or various alternative blocks of discrete circuitry as known in the art, designed or otherwise programmed to perform or direct the performance of functions as further defined herein. In the context of general purpose processors, it may be understood that such components include or otherwise are functionally linked to non-transitory machine-readable memory media having program instructions residing therein and executable to perform or direct the performance of certain defined functions.

Referring generally to FIGS. 5 and 8-15, various embodiments of a switch-mode power converter having an integrated magnetic structure in accordance with the present invention may be described herein. Where the various figures may describe embodiments sharing various common elements and features with other embodiments, similar elements and features are given the same reference numerals and redundant description thereof may be omitted below.

Figure 4A:
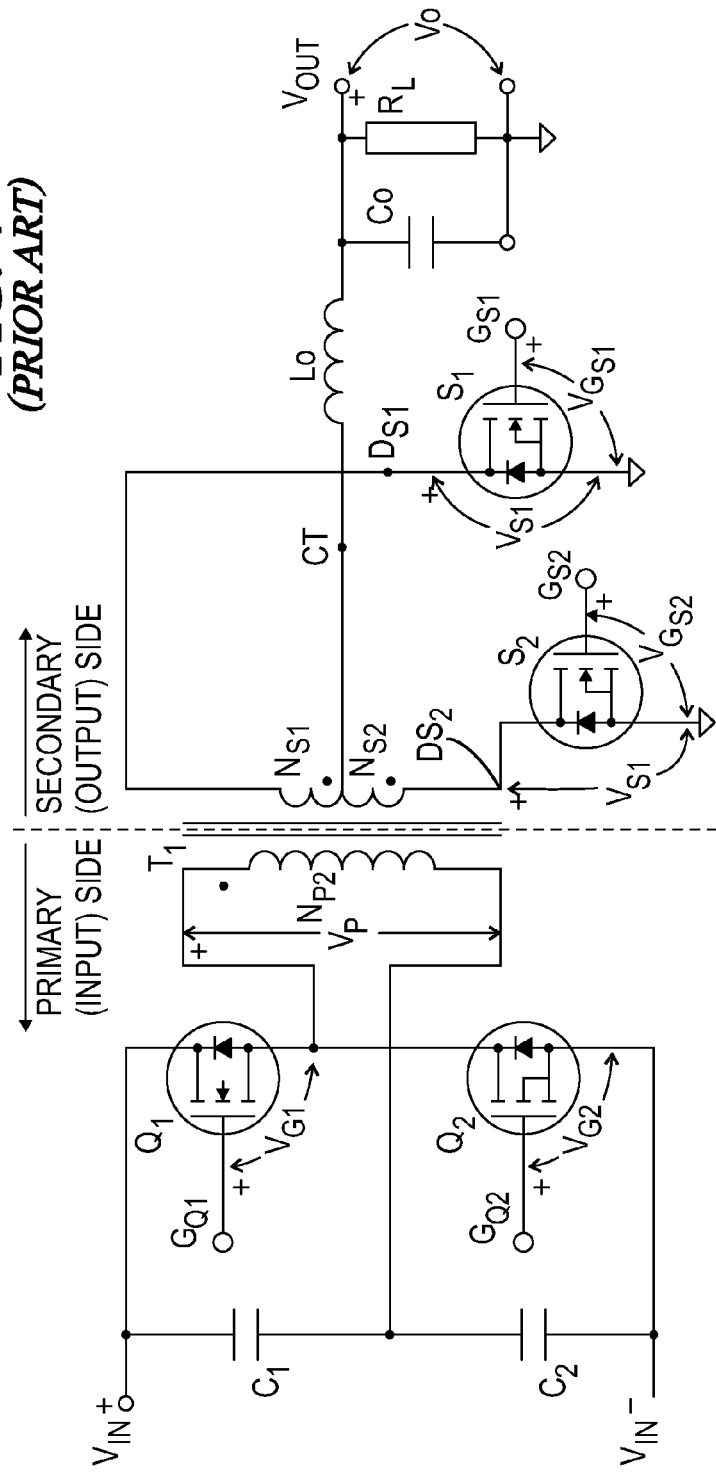
FIG. 4 illustrates another embodiment of the prior art circuit of FIG. 1 in which a drive transformer $T_2$ is used to directly drive the primary side switches and provide the required timing between the drive signals for the primary switches and the synchronous rectifiers.
Figure 4B:
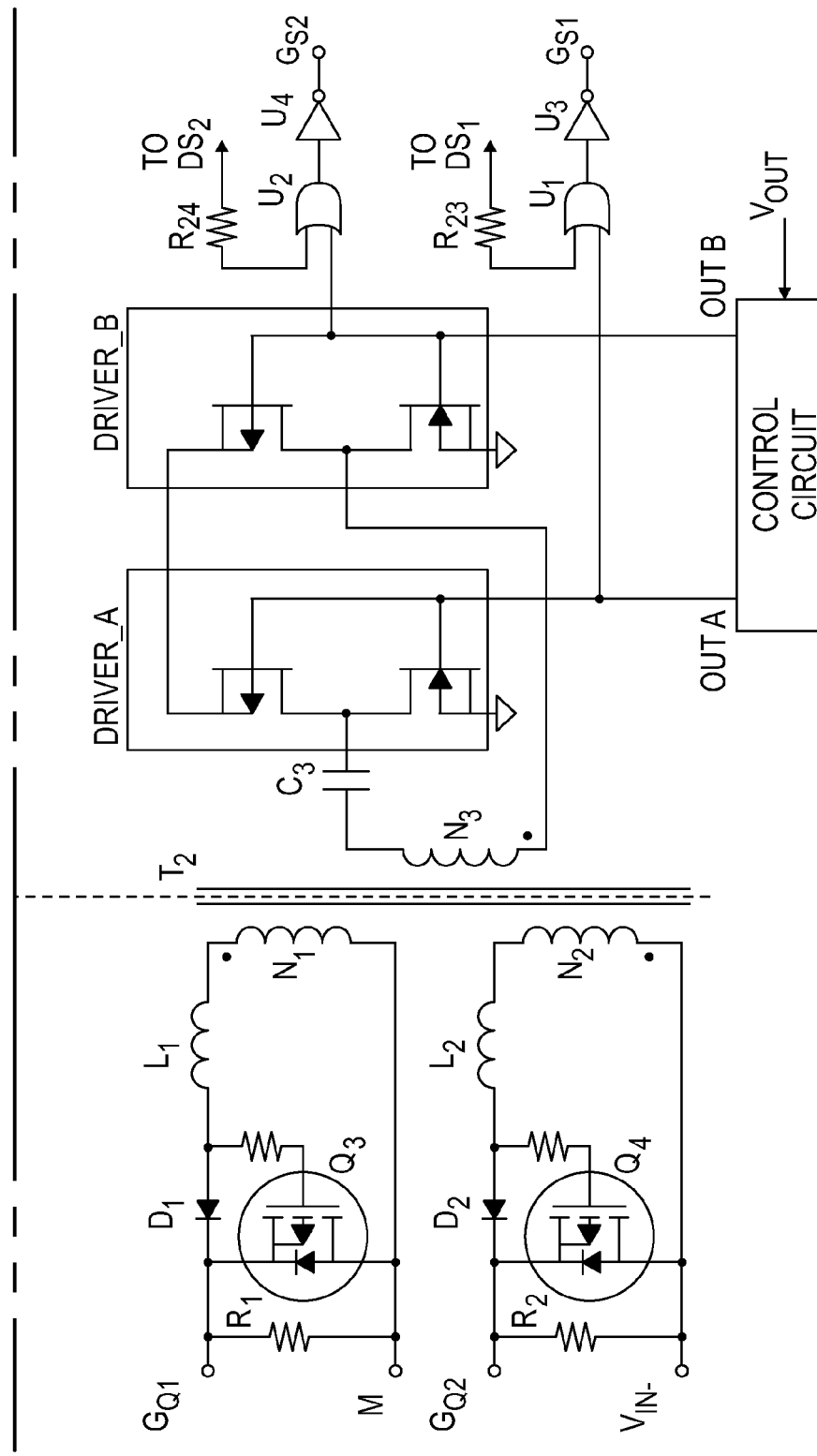
Figure 5A:
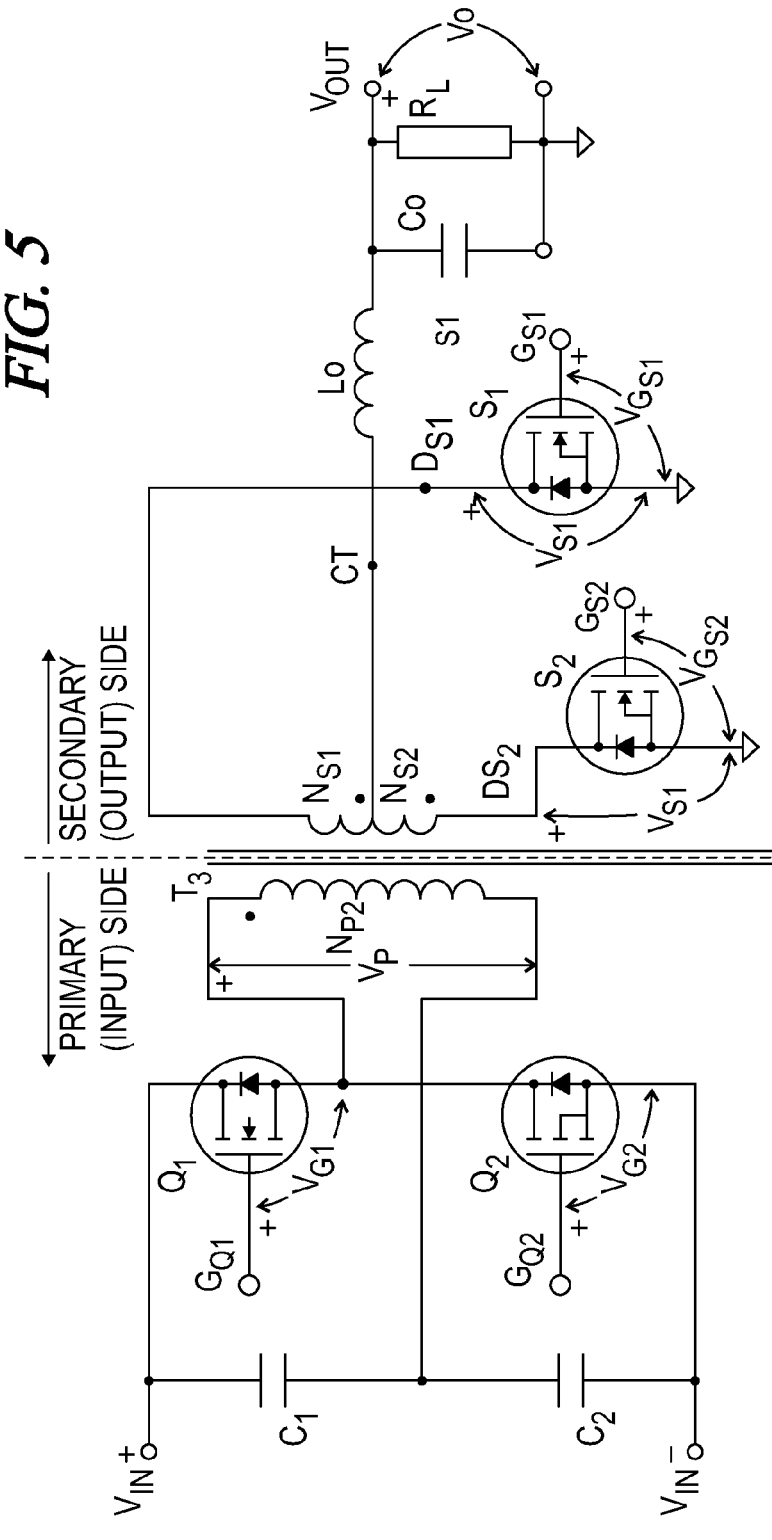
FIG. 5 is a schematic diagram of an embodiment of a power converter in accordance with the present invention, having a drive transformer integrated with the power isolation transformer.
Figure 5B:
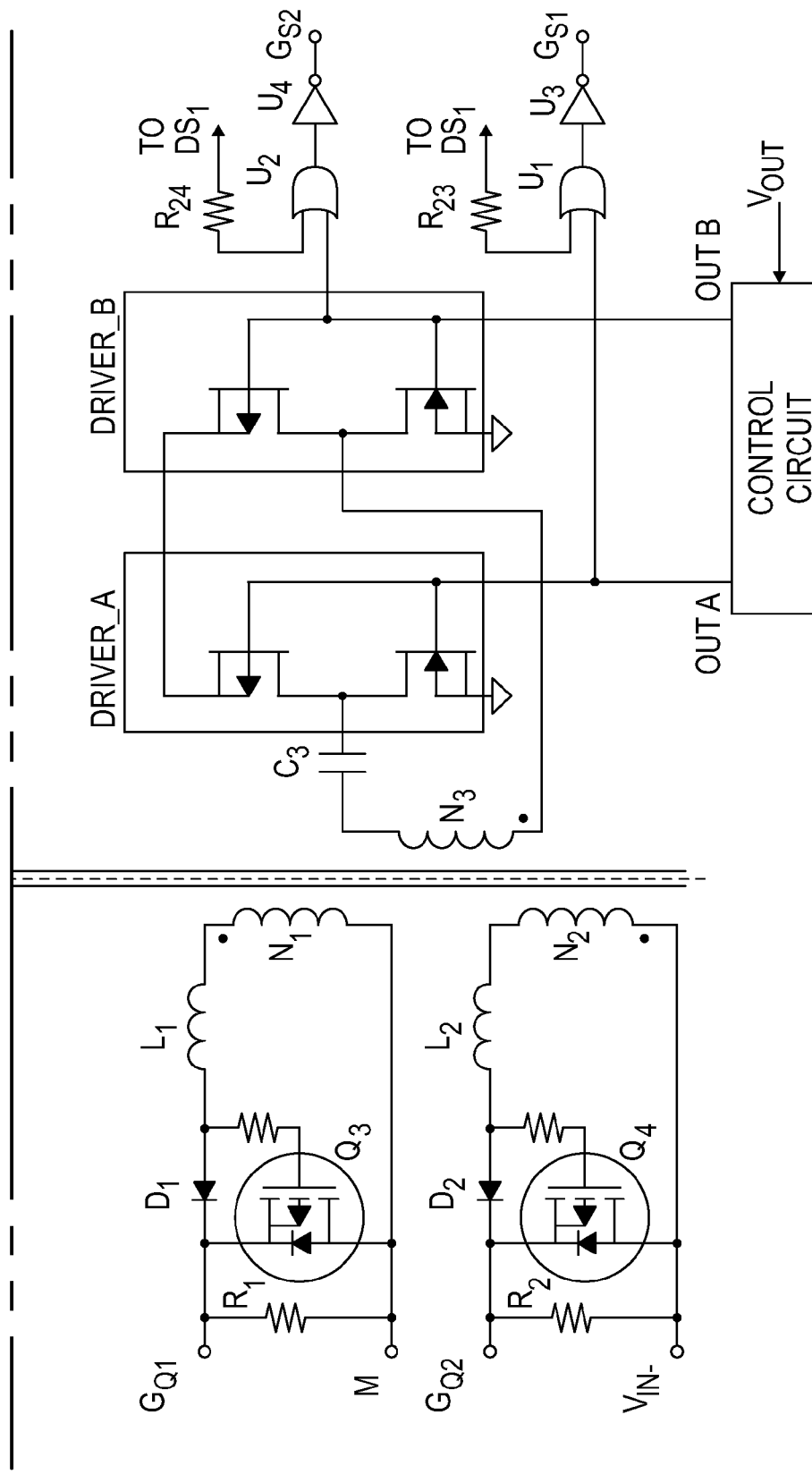
Figure 6:
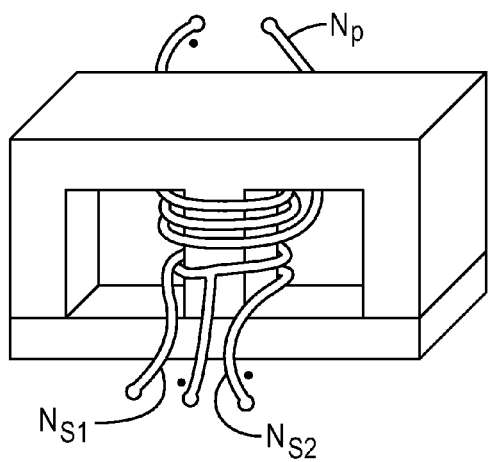
FIG. 6 is an oblique view of a prior art power transformer $T_1$ as may be used in the converter circuit of FIG. 4.

With reference to FIG. 5, there is shown an embodiment of the present invention used with a half-bridge converter and developed in part from a design as represented in FIG. 4. An important difference between the circuits shown in FIG. 5 and FIG. 4 is the implementation of the drive transformer $T_2$. For better understanding, an oblique view of a prior art power transformer $T_1$ as used in the circuit of FIG. 4 is shown in FIG. 6. A prior art power transformer is typically implemented with a magnetic core having a center leg and two outer legs. The primary winding $N_P$ is wound around the center leg of the core, as are the center tapped secondary windings $N_{S1}$ and $N_{S2}$. The magnetic flux induced by current flow in the winding primary $N_P$ circulates through both outer legs of the core, inducing a voltage in windings $N_{S1}$ and $N_{32}$.

Figure 7:
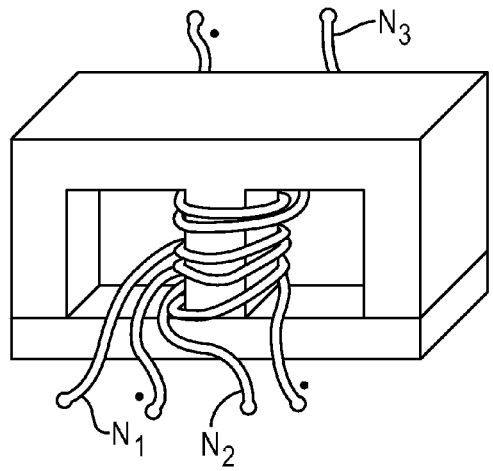
FIG. 7 is an oblique view of a prior art drive transformer $T_2$ as may be used in the converter circuit of FIG. 4.

An oblique view of a prior art drive transformer $T_2$ as used in the circuit of FIG. 4 is shown in FIG. 7, having a construction similar to the power transformer $T_1$ shown in FIG. 6. This prior art drive transformer is typically implemented with a magnetic core having a center leg and two outer legs. All three windings, $N_1$, $N_2$ and $N_3$ of the drive transformer are typically wound around the center leg of the core so that they will be tightly coupled.

Figure 8:
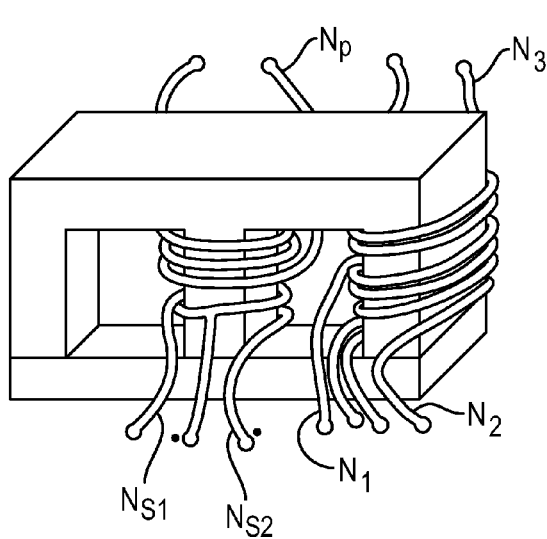
FIG. 8 is an oblique view of a transformer $T_3$ as may be used in the converter circuit of FIG. 5, showing integration of the windings of the power transformer and drive transformer on the same magnetic core according to one aspect of the present invention.

Referring now to FIG. 8, an oblique view of an integrated magnetic structure according to present invention is shown. In this embodiment, the windings of power transformer $T_1$ and drive transformer $T_2$ used in the circuit of FIG. 4 are shown. The windings of the power transformer $T_1$ are wound around the center leg of the core in the same manner as shown in FIG. 6. However, all windings of the drive transformer $T_2$ (as shown in FIG. 7) are wound around one of the outer legs of the core, thus preserving tight coupling. The windings of the drive transformer, being wound on one of the outer legs of the core of the power transformer, are thereby loosely coupled with windings of the power transformer.

Because of the loose coupling, it is possible to have voltage waveforms on the windings of the drive transformer that are different from the voltage waveforms on the windings of the power transformer for a short periods of time, without creating significant voltage or current stresses in the drive circuit. The time during which the voltage waveforms can be different is long enough to initiate switching transitions (turn-on and turn-off) of either the primary switches or/and the secondary switches of the converter (which in certain embodiments may be synchronous rectifiers). Once a switching transition is initiated, the voltage waveforms on the windings of the drive transformer will be similar to the voltage waveforms the power transformer until next switching transition.

Figure 10:
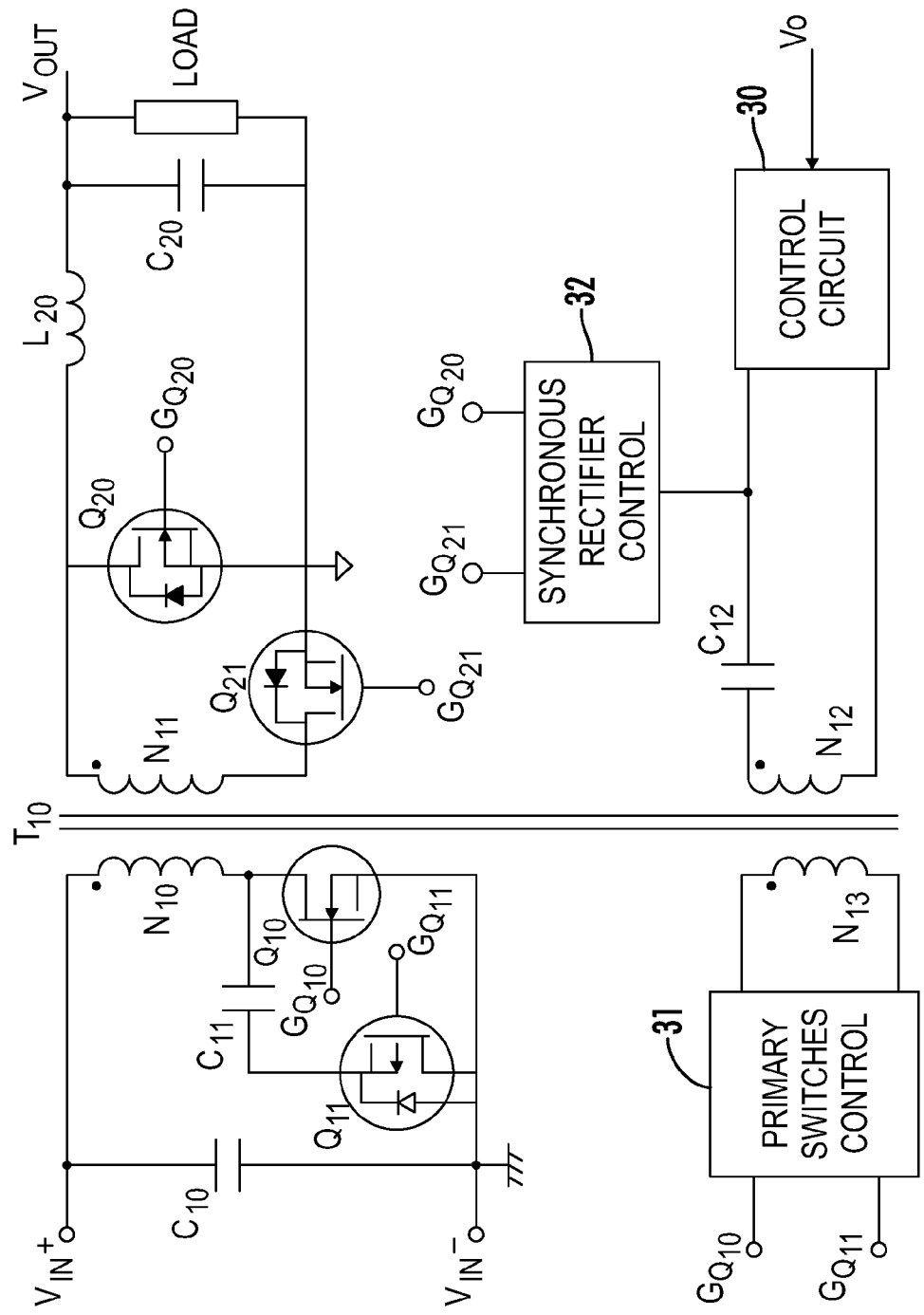
FIG. 10 is schematic diagram of an active clamp forward converter with a power transformer and drive transformer integrated on one magnetic core according to the present invention, with the control circuit on the output side of the converter.

The present invention can be used with other power converter embodiments. For example, FIG. 10 shows an active clamp forward converter, in which an active clamp circuit (switch Q11 and capacitor C11) is used to clamp the drain-to-source voltage of the primary switch Q10 to an acceptable level by allowing the magnetizing current to circulate in the core of transformer $T_{10}$ during the reset period. An integrated transformer $T_{10}$ is used in accordance with the present invention, having power isolation transformer windings $N_{10}$, $N_{11}$ and drive transformer windings $N_{12}$, $N_{13}$ wound on a single magnetic core, using the winding and core arrangement generally shown in FIG. 8. In the embodiment of FIG. 10, the control circuit 30 is configured on the output side of the converter. The control circuit 30 is functionally coupled to the rectifier control circuit 32 for driving secondary (e.g., synchronous rectifier) switches Q20 and Q21 and to the primary switch control circuit 31 used for driving primary side switch Q10 and active clamp switch Q11.

Figure 11:
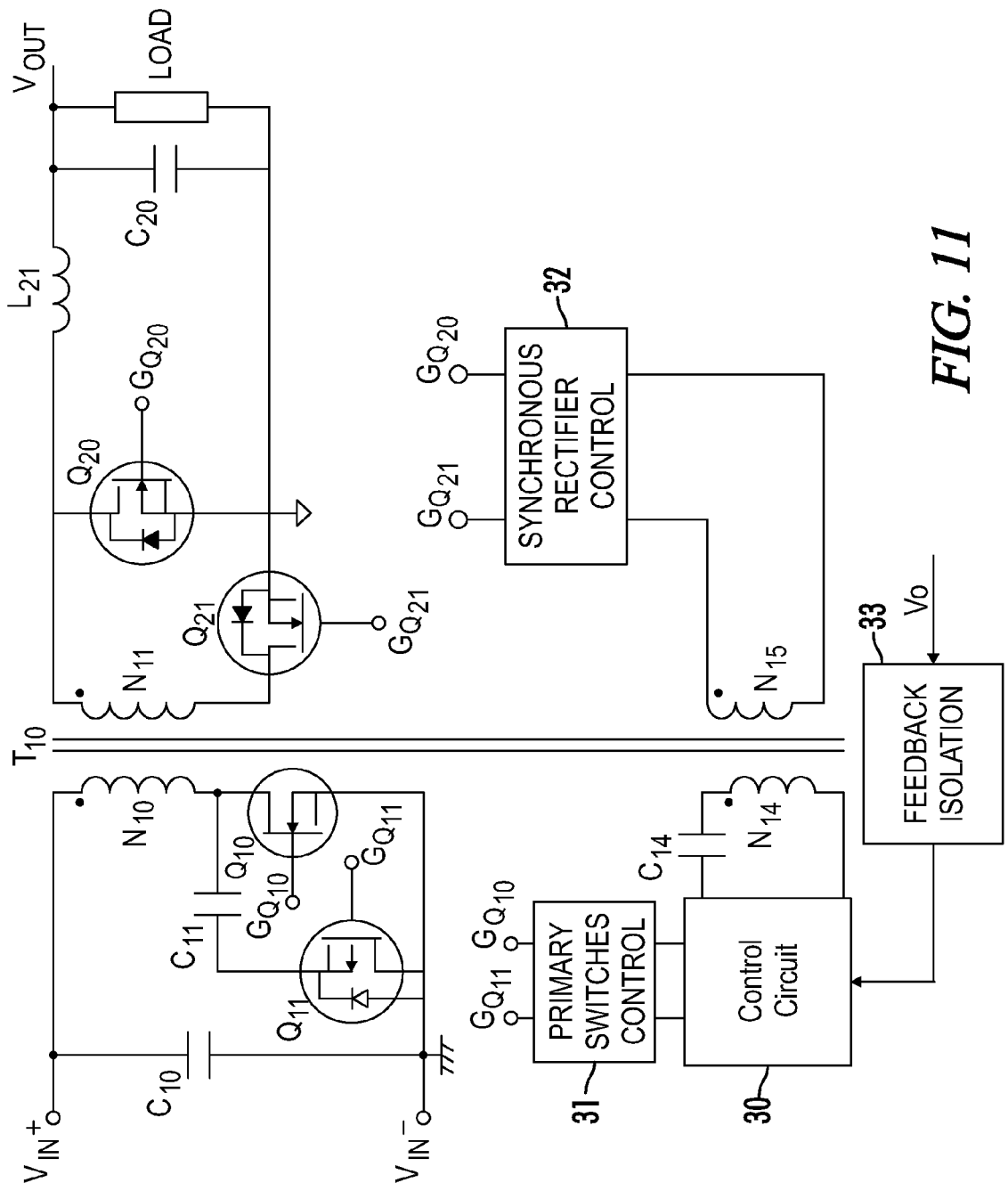
FIG. 11 is a schematic diagram of an active clamp forward converter with a power transformer and drive transformer integrated on one magnetic core according to the present invention, with the control circuit on the input side of the converter.

In another application, FIG. 11 shows an active clamp forward converter having a topology similar to that shown in FIG. 10. In accordance with the present invention, a transformer $T_{10}$ has power isolation transformer windings $N_{10}$, $N_{11}$ and drive transformer windings $N_{14}$, $N_{15}$ wound on a single magnetic core, using the winding and core arrangement generally shown in FIG. 8. In this application, the control circuit 30 is configured on the input side of the converter. The control circuit 30 is functionally coupled to the rectifier control circuit 32 for driving synchronous rectifier switches Q20 and Q21 and to the primary switch control circuit 31 used for driving primary side switch Q10 and active clamp switch Q11.

Figure 12:
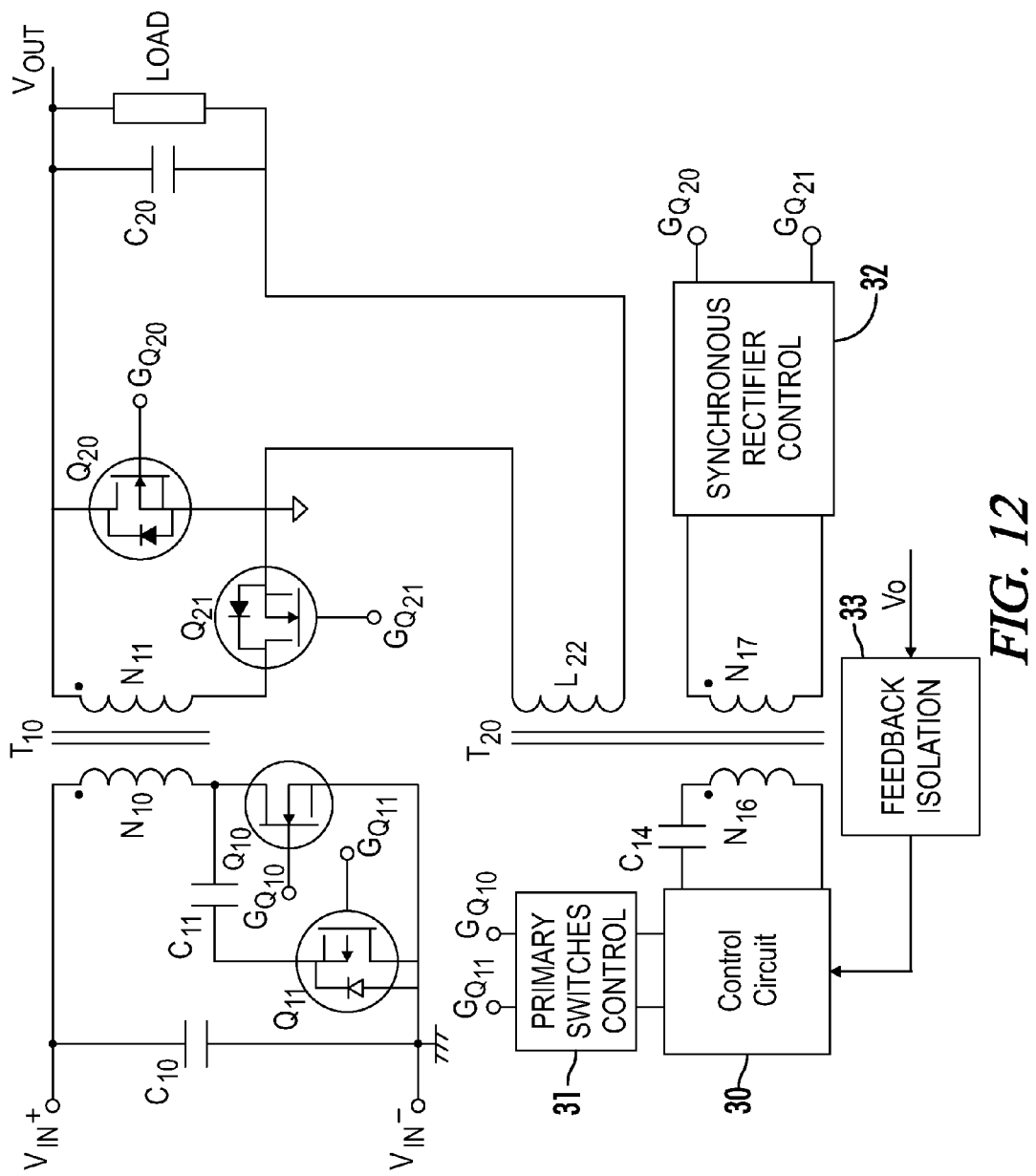
FIG. 12 is a schematic diagram of an active clamp converter with an output inductor ($L_{22}$) and drive transformer integrated on one magnetic core according to the present invention, with the control circuit on the input side of the converter.

In yet another application, FIG. 12 shows an active clamp converter similar to those illustrated in FIGS. 10 and 11, but having a power isolation transformer $T_{10}$ and a separate drive transformer $T_{20}$ in which the output inductor $L_{22}$ and drive transformer windings $N_{16}$ and $N_{17}$ are integrated on a single magnetic core. In this application, the control circuit 30 is configured on the input side of the converter. The control circuit 30 is functionally coupled to the rectifier control circuit 32 for driving synchronous rectifier switches Q20 and Q21 and to the primary switch control circuit 31 used for driving primary side switch Q10 and active clamp switch Q11. Feedback isolation circuit 33 couples output voltage Vo to control circuit 30.

Figure 13:
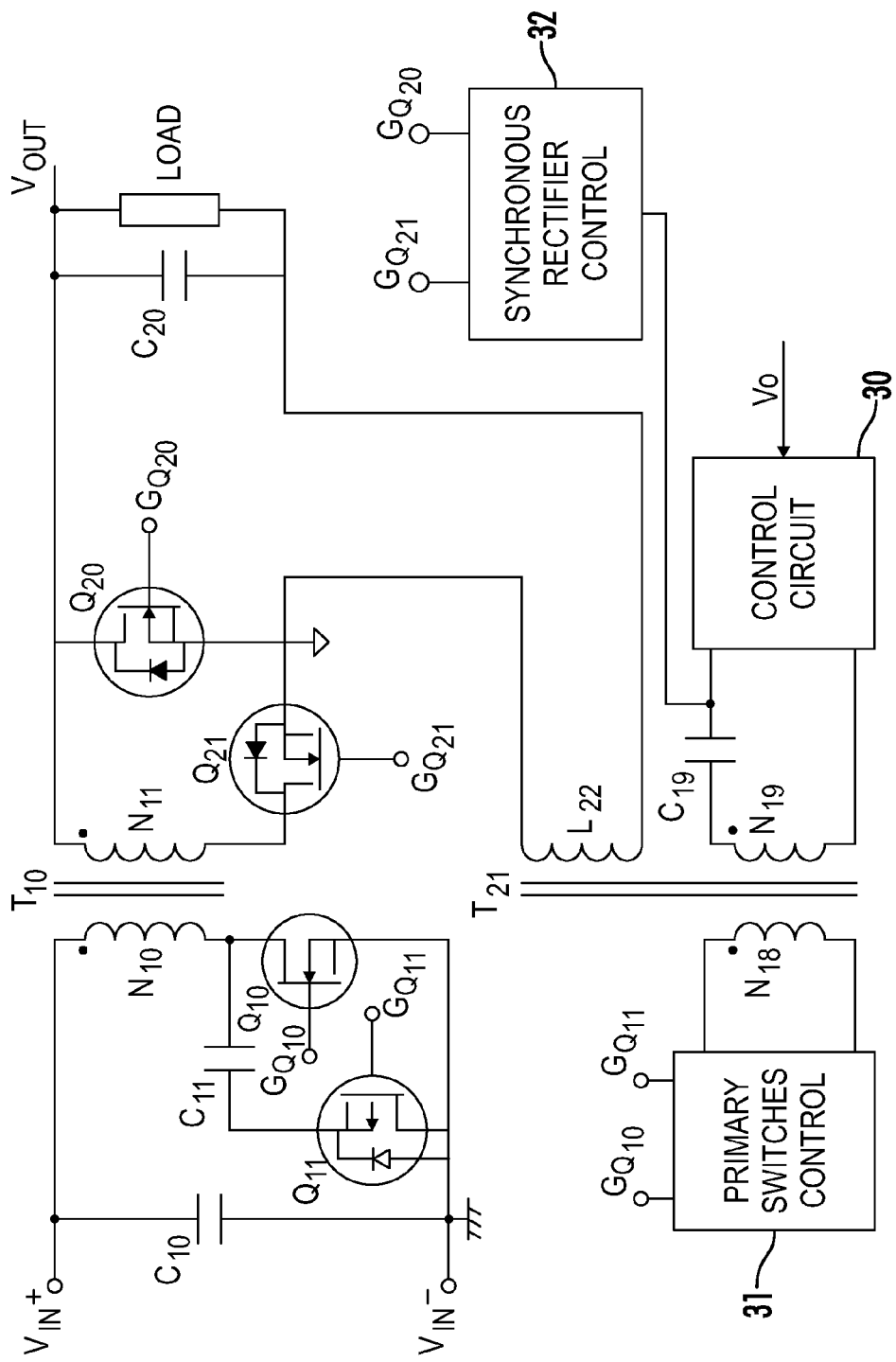
FIG. 13 is a schematic diagram of an active clamp converter with an output inductor ($L_{22}$) and drive transformer integrated on one magnetic core according to the present invention, with the control circuit on the output side of the converter.

FIG. 13 illustrates another application of the present invention, showing an active clamp converter with a power isolation transformer $T_{10}$ and a separate drive transformer $T_{21}$ in which an output inductor $L_{22}$ and drive transformer windings $N_{18}$ and $N_{19}$ are integrated on a single magnetic core. In this application, the control circuit 30 is configured on the output side of the converter. The control circuit 30 is functionally coupled to the rectifier control circuit 32 for driving synchronous rectifier switches Q20 and Q21 and to the primary switch control circuit 31 used for driving primary side switch Q10 and active clamp switch Q11.

Figure 14:
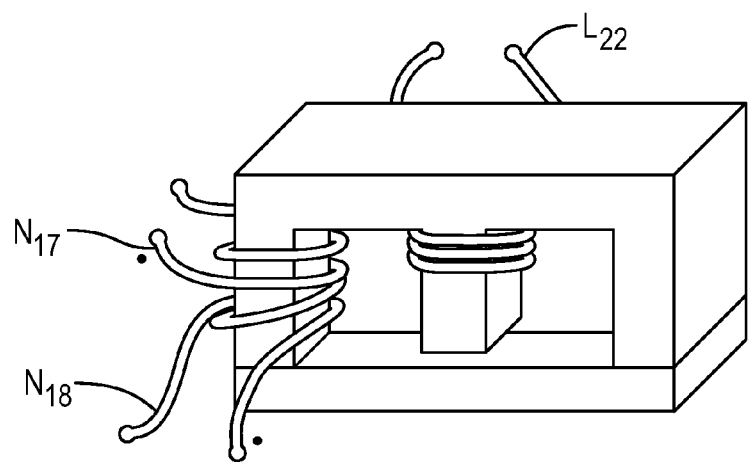
FIG. 14 is an oblique view of one embodiment of an integrated output inductor and drive transformer as may be used in the active clamp converters shown in FIGS. 12 and 13, according to an aspect of the invention.

FIG. 14 shows an embodiment of an integrated output inductor and drive transformer in accordance with the present invention, as may be used in the active clamp converters shown in FIGS. 12 and 13.

Figure 3:
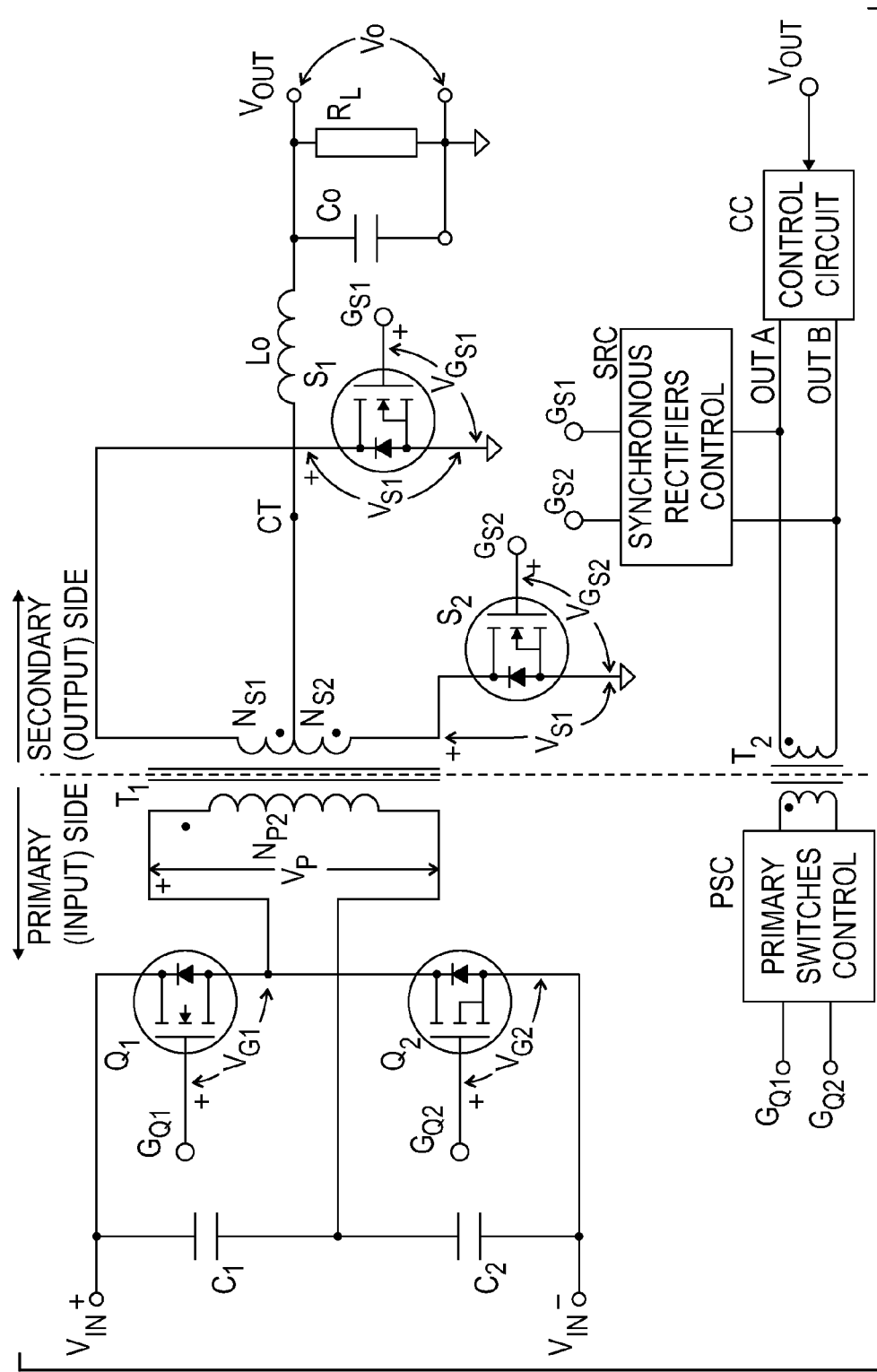
FIG. 3 is an embodiment of the prior art circuit shown in FIG. 1, with a drive transformer used to transfer the output of the control circuit CC to the primary switches control circuit PSC.
Figure 9:
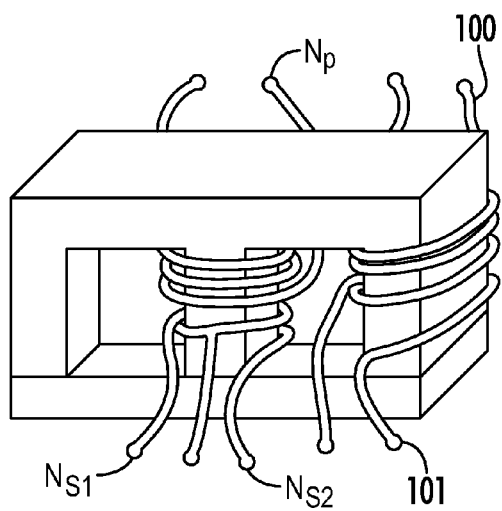
FIG. 9 is an oblique view of a transformer $T_{12}$ as may be used in the converter circuit of FIG. 15, showing integration of the windings of the power transformer and drive transformer on the same magnetic core according to one aspect of the present invention.
Figure 15:
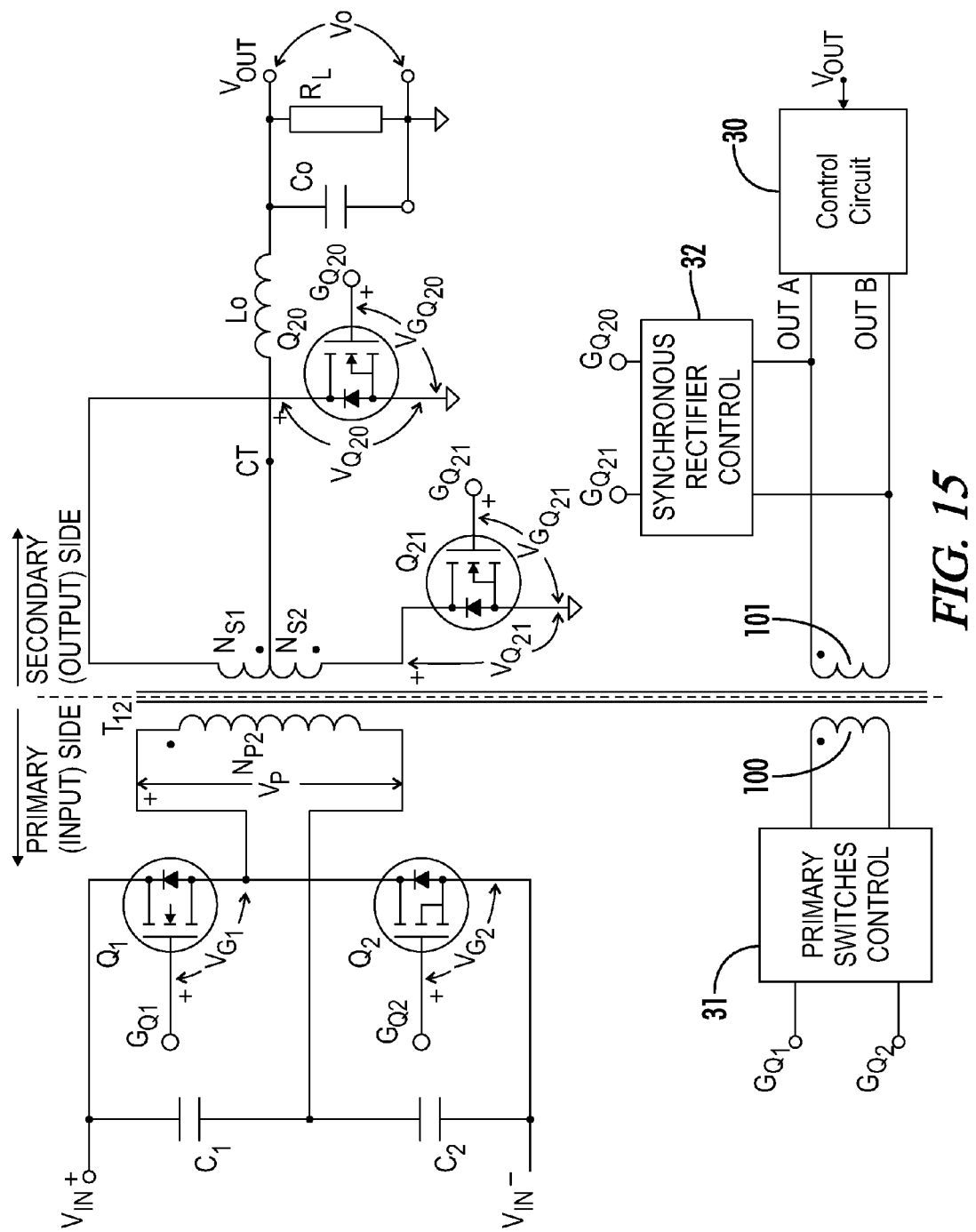
FIG. 15 is a schematic diagram of an embodiment of the power converter circuit of FIG. 3, but with the power isolation transformer and drive transformer integrated into a single transformer $T_{12}$, according to an aspect of the present invention.

FIG. 15 illustrates another application of the present invention, showing the converter circuit of FIG. 3 but with a power isolation transformer primary winding $N_{P2}$, split secondary windings $N_{S1}$, $N_{S2}$, and drive transformer windings 100 and 101 integrated on a single magnetic core of transformer $T_{12}$, as shown in FIG. 9.

According to other aspects of the invention, the converter drive voltage can be clamped to be independent of input voltage, because of the loose coupling between the windings of drive transformer relative to the windings of the power transformer. The drive voltage can be also adjusted to be a function of input voltage in applications where it is beneficial.

According to other aspects of the invention, energy delivered to the control/drive circuit via a winding can be also controlled or increased by introducing a gap into the center leg or outer leg of the core in a manner as may be understood by one of skill in the art. A small gap in the center leg may be needed in case of a very wide input voltage range as well as prolonged operation of the converter with the synchronous rectifiers disabled.

In yet another embodiment of invention, the windings of the drive transformer can be wound around both the center and outer legs of the magnetic core, in which case the drive voltage for the controllable switches will be more dependent on the input voltage and only a portion of the drive voltage that can be clamped is across the winding wound around the outer leg.

In further alternative embodiments, the present invention can be used in different converter topologies, including half-bridge (symmetric, asymmetric), full-bridge (symmetric, asymmetric), push-pull, forward converter (standard, active clamp, dual transistor), forward-flyback, and many others known in the art.

In general, the present invention is applicable to all topologies in which the voltage across the windings of the power transformer or inductor has substantially the same waveform with the drive voltage of the various controllable switches.

The previous detailed description has been provided for the purposes of illustration and description. Thus, although there have been described particular embodiments of the present invention of new and useful "Integrated Magnetics with Isolated Drive Circuit," it is not intended that such references be construed as limitations upon the scope of this invention except as set forth in the following claims.

What is claimed is:

1. A switch-mode power converter for converting an input voltage from an input source to an output voltage for supply to a load coupled to converter load terminals, the power converter comprising:
    a power isolation transformer further comprising a magnetic core having a center leg and outer legs, one or more primary windings and one or more secondary windings of the power transformer being wound on the center leg;
    a primary converter circuit comprising one or more primary controllable power switches effective to supply the input voltage to one or more primary windings of the power isolation transformer;
    a secondary converter circuit fully isolated from the primary converter circuit and comprising one or more secondary switches being individually switchable and further coupled between the one or more secondary windings and the load terminals;
    a primary switch control circuit effective to control conduction of one or more primary controllable power switches;
    a secondary switch control circuit effective to control conduction of the one or more secondary switches;
    a control circuit effective to control operation of the primary switch control circuit and the secondary switch control circuit based at least in part on a feedback signal;
    a drive transformer comprising at least first and second drive transformer windings wound on an outer leg of the magnetic core, the drive transformer windings configured to provide power for controlling the primary and secondary switches, the drive transformer windings further configured to provide isolation between the primary and secondary control circuits;
    the voltage across primary windings having voltage waveforms of similar shape as the drive voltage of the controllable power switches except during turn-on and turn-off transitions; and
    the windings of the drive transformer tightly coupled with each other on the outer leg, and further loosely coupled with the windings of the power transformer, wherein different voltage waveforms are provided in the windings of the drive transformer and windings of power transformer for a short period of time sufficient to initiate turn-on or turn-off of the controllable switches coupled to the power transformer.

2. The switch-mode power converter of claim 1, the magnetic core comprising an E-shaped core having a center leg and two outer legs.

3. The switch-mode power converter of claim 2, comprising:
    a primary switch control circuit for each primary controllable power switch;
    the drive transformer further comprising two or more drive transformer windings wound on an outer leg of the magnetic core, the first drive transformer winding connected to the control circuit, the other drive transformer windings connected to primary switch control circuits to control operation of the primary controllable switches as well as providing power for controlling the primary controllable power switches,
    the drive transformer windings further configured to provide isolation between primary switch control circuits and the synchronous rectifiers control circuit.

4. The switch-mode power converter of claim 1, further comprising an active clamp circuit effective to clamp a drive voltage for power switches, control circuit and synchronous rectifiers independent of the input voltage.

5. The switch-mode power converter of claim 1, drive transformer windings being wound in distributed fashion on both of an outer leg and the center leg of the magnetic core.

6. The switch-mode power converter of claim 1, the magnetic core further comprising a gap in the center leg upon which transformer windings are associated.

7. The switch-mode power converter of claim 6, further comprising an active clamp circuit effective to clamp a portion of the drive voltage as induced by the outer leg.

8. The switch-mode power converter of claim 7, the drive transformer further effective to provide power to control circuit and synchronous rectifiers control circuit via first drive transformer winding.

9. The switch-mode power converter of claim 1, comprising:
    an output inductor further comprising an inductor magnetic core having at least one inner leg, a winding being wound on an inner leg, the winding having a voltage waveform of similar shape as that of drive voltage waveforms of the primary controllable switches except during their turn-on and turn-off transitions,
    the windings of the drive transformer tightly coupled with each other on an outer leg of the inductor magnetic core, and further loosely coupled with the winding of the output inductor, wherein different voltage waveforms are provided in the windings of the drive transformer and winding of the output inductor for a short period of time sufficient to initiate turn-on or turn-off of the controllable switches coupled to the power transformer.

10. The switch-mode power converter of claim 9, the drive transformer windings being wound in distributed fashion on both of an outer leg and the center leg of the inductor magnetic core.

11. The switch-mode power converter of claim 9, further comprising an active clamp circuit effective to clamp a drive voltage for the primary controllable switches independent of the input voltage.

12. The switch-mode power converter of claim 9, further comprising an active clamp circuit effective to clamp a portion of the drive voltage as induced by the outer leg.

13. The switch-mode power converter of claim 9, the drive transformer further effective to provide power to control circuit and synchronous rectifiers control circuit via the first drive transformer winding.

14. A switch-mode power converter for converting an input voltage from an input source to an output voltage for supply to a load coupled to converter load terminals, the power converter comprising:
- a power isolation transformer further comprising a magnetic core having a center leg and outer legs, one or more primary windings and one or more secondary windings of the power transformer being wound on the center leg;
- a primary converter circuit comprising one or more primary controllable power switches effective to supply the input voltage to one or more primary windings of the power isolation transformer;
- a secondary converter circuit fully isolated from the primary converter circuit and comprising one or more secondary switches being individually switchable and further coupled between the one or more secondary windings and the load terminals;
- a primary switch control circuit effective to control conduction of the one or more primary controllable power switches;
- a secondary switch control circuit effective to control conduction of the one or more secondary switches;
- an output inductor further comprising an inductor magnetic core having at least one inner leg, an output inductor winding being wound on an inner leg; and
- a drive transformer comprising at least first and second drive transformer windings tightly coupled with each other on an outer leg of the inductor magnetic core, and further loosely coupled with the winding of the output inductor, the drive transformer windings configured to provide power for controlling the primary and secondary switches, the drive transformer windings further configured to provide isolation between the primary and secondary control circuits,
- wherein different voltage waveforms are provided in the windings of the drive transformer and winding of the output inductor for a short period of time sufficient to initiate turn-on or turn-off of the controllable switches coupled to the power transformer, and
- wherein the output inductor winding having a voltage waveform of similar shape as that of drive voltage waveforms of the primary controllable switches except during their turn-on and turn-off transitions.

15. The switch-mode power converter of claim 14, the drive transformer windings being wound in distributed fashion on both of an outer leg and the center leg of the inductor magnetic core.

16. The switch-mode power converter of claim 14, further comprising an active clamp circuit effective to clamp a drive voltage for the primary controllable switches independent of the input voltage.

17. The switch-mode power converter of claim 14, further comprising an active clamp circuit effective to clamp a portion of the drive voltage as induced by the outer leg.

18. A switch-mode power converter for converting an input voltage from an input source to an output voltage for supply to a load coupled to converter load terminals, the power converter comprising:
- a power isolation transformer further comprising a magnetic core having a center leg and outer legs, one or more primary windings and one or more secondary windings of the power transformer being wound on the center leg;
- a primary converter circuit comprising one or more primary controllable power switches effective to supply the input voltage to one or more primary windings of the power isolation transformer;
- a secondary converter circuit fully isolated from the primary converter circuit and comprising one or more secondary switches being individually switchable and further coupled between the one or more secondary windings and the load terminals;
- a primary switch control circuit effective to control conduction of one or more primary controllable power switches;
- a secondary switch control circuit effective to control conduction of the one or more secondary switches;
- a control circuit effective to control operation of the primary switch control circuit and the secondary switch control circuit based at least in part on a feedback signal; and
- a drive transformer comprising at least first and second drive transformer windings wound in distributed fashion on both of an outer leg and the center leg of the magnetic core, the drive transformer windings configured to provide power for controlling the primary and secondary switches, the drive transformer windings further configured to provide isolation between the primary and secondary control circuits.

* * * * *